US012779380B1

(12) United States Patent
Beets

(10) Patent No.: US 12,779,380 B1
(45) Date of Patent: Nov. 3, 2026

(54) DISPOSABLE VESSEL FOR REMOVAL OF CONTAMINANTS IN LIQUIDS

(71) Applicant: AVANTech, LLC, Columbia, SC (US)

(72) Inventor: Larry Edward Beets, Knoxville, TN (US)

(73) Assignee: AVANTech, LLC, Columbia, SC (US)

( * ) Notice: Subject to any disclaimer, the term of this patent is extended or adjusted under 35 U.S.C. 154(b) by 360 days.

(21) Appl. No.: 18/651,056

(22) Filed: Apr. 30, 2024

Related U.S. Application Data

(60) Provisional application No. 63/463,445, filed on May 2, 2023.

(51) Int. Cl.

| | |
|---|---|
| ***B01D 36/00*** | (2006.01) |
| ***B01D 15/36*** | (2006.01) |
| ***B01D 29/54*** | (2006.01) |
| ***G21F 9/12*** | (2006.01) |

(52) U.S. Cl.
CPC ........... *B01D 36/00* (2013.01); *B01D 15/361* (2013.01); *B01D 29/54* (2013.01); *G21F 9/12* (2013.01)

(58) Field of Classification Search
CPC ... G21F 9/007; G21F 9/04; G21F 9/12; G21F 9/16; G21F 9/162; B01D 2311/2623; B01D 63/062; B01D 2201/0407; B01D 2201/043; B01D 2319/02; B01D 2319/025; B01D 2319/06
See application file for complete search history.

(56) References Cited

U.S. PATENT DOCUMENTS 5,443,724 A * 8/1995 Williamson ......... B01D 17/045 210/488
6,387,274 B1 5/2002 Hendricks et al.
9,218,897 B1 12/2015 Braun
2012/0111786 A1* 5/2012 Chiang .................. B01D 29/52 210/232

(Continued)

FOREIGN PATENT DOCUMENTS

WO 2013/085644 A1 6/2013

OTHER PUBLICATIONS

AVANtech, "Innovative Filtration System Shortens Schedule and Delivers Radwaste Savings," Nuclear Newswire, 5 pages (2023) https://www.ans.org/news/article-4735/innovative-filtration-system-shortens-schedule-and-delivers-radwaste-savings. Dated Feb. 24, 2023, retrieved on Jan. 29, 2026.

(Continued)

*Primary Examiner* — Pranav N Patel
(74) *Attorney, Agent, or Firm* — Nelson Mullins Riley & Scarborough LLP

(57) ABSTRACT

A vessel for treatment of liquid comprising a housing having an inlet port and an outlet port connectable to an effluent pipe. An inlet pipe conducts liquid to be treated from the inlet port into the interior space of the housing. An outlet pipe conducts treated liquid from the interior space of the housing to the outlet port. The interior space of the housing defines a mechanical filtration zone and a sorption zone downstream of the mechanical filtration zone. The mechanical filtration zone has a mechanical filtration assembly adapted to receive the liquid to be treated from the inlet pipe and produce filtered liquid. The sorption zone has a sorption assembly adapted to remove at least one colloidal or soluble contaminant from the filtered liquid to produce the treated liquid. The vessel is closed after use and stored or disposed.

27 Claims, 8 Drawing Sheets

(56) References Cited

U.S. PATENT DOCUMENTS

| | | | | |
|---|---|---|---|---|
| 2015/0144555 | A1 * | 5/2015 | Lange | B01D 29/52<br>210/636 |
| 2018/0186662 | A1 | 7/2018 | Barker et al. | |
| 2025/0002373 | A1 * | 1/2025 | Ryu | B01D 35/157 |

OTHER PUBLICATIONS

AVANtech, "Solids Collection Filter (SCF™) AVANTech's stand-alone solution to simplify the treatment train," published Feb. 15, 2023, 1 page.

* cited by examiner

DISPOSABLE VESSEL FOR REMOVAL OF CONTAMINANTS IN LIQUIDS

PRIORITY CLAIM

This application is based upon and claims priority to U.S. provisional application Ser. No. 63/463,445, filed May 2, 2023, which is incorporated herein by reference in its entirety for all purposes.

FIELD OF THE INVENTION

The present invention relates generally to treatment of contaminants in liquids, particularly in nuclear facilities, and disposal of the used filtration media.

BACKGROUND OF THE INVENTION

Mechanical filtration is commonly used in water treatment in order to remove particulate material in the water. In the nuclear industry, however, filtration is particularly problematic because of personnel exposure and contamination control concerns associated with handling of individual filters. Additionally, filter waste classification and disposal can be complicated and time consuming.

Over the past 20 years, the present applicant (AVANTech LLC) and its predecessor have developed and proven its Solids Collection Filter (SCF™) technology used in nuclear plant primary systems (i.e., spent fuel pools, torus, and suppression pools). The AVANTech Solids Collection Filter (SCF™) line of products provides the nuclear industry with high-capacity filters contained in the final disposable container. Performing filtration in the final disposal container eliminates the need for handling, packaging, and classification of individual filters. The results are mitigation of personnel contamination events, lower exposure rates to personnel, minimization of labor hours involved with handling, packaging, disposal of the radioactive waste, and in many cases improvements in critical path time during outages.

For example, a Solids Collection Filter (SCF™) device may be used to provide fine particulate filtration on Nuclear Plant—Spent Fuel Pools (SFP). This is done to maintain clarity for underwater work and to lower general area dose rates from isotopes in the water. Removal of particulate (activation products, and in particular Co60) in the SFPs can appreciably lower the general area dose rates surrounding the SFP's and thus lower the whole-body dose received by the radiation worker performing tasks around the SFP.

The minimum level of filtration of a SCF device is 1-micron absolute (~0.3-micron nominal). As such, removal of fine colloidal (sub-micron particulate) and soluble (dissolved) radioactive isotopes requires additional technologies. Generally, colloidal, and soluble radioactive isotopes are removed using sorption or membrane technologies such as reverse osmosis (RO).

SUMMARY

The present invention recognizes and addresses various considerations of prior art constructions and methods. In this regard, one aspect of the present invention provides a vessel for treatment of liquid comprising a housing having an inlet port connectable to an influent pipe and an outlet port connectable to an effluent pipe, the housing defining an interior space. An inlet pipe is in fluid communication with the inlet port and is configured to conduct liquid to be treated from the inlet port into the interior space of the housing. An outlet pipe is in fluid communication with the outlet port and is configured to conduct treated liquid from the interior space of the housing to the outlet port. The interior space of the housing defines a mechanical filtration zone and a sorption zone downstream of the mechanical filtration zone. The mechanical filtration zone has a mechanical filtration assembly adapted to receive the liquid to be treated from the inlet pipe and produce filtered liquid. The sorption zone has a sorption assembly adapted to remove at least one colloidal or soluble contaminant from the filtered liquid to produce the treated liquid. The vessel is preferably adapted to be dewatered and closed after use and then sent to an interim storage or disposal facility.

According to some exemplary embodiments, a separator plate may be situated at an intermediate location in the interior space of the housing to separate the mechanical filtration zone from the sorption zone. The separator plate may define at least one through bore for passage of the filtered liquid from the mechanical filtration zone to the sorption zone. According to some exemplary embodiments, the mechanical filtration assembly may comprise a plurality of cylindrical filtration elements (e.g., at least 5 filtration elements, at least 20 filtration elements, at least 30 filtration elements, at least 40 filtration elements, at least 50 filtration elements, or more) located in the mechanical filtration zone. For example, the separator plate may define a plurality of through bores, each in fluid communication with a filter outlet of a respective one of the plurality of cylindrical filtration elements. The filter outlet of each of the cylindrical filtration elements may be concentric with an axis of the cylindrical filtration element.

According to some exemplary embodiments, a plurality of spreader elements may be connected to the separator plate respectively adjacent to at least some of the through bores to spread the filtered liquid as it enters the sorption zone. The plurality of filtration elements may be mounted in parallel with one another and may be captured between the separator plate and a foraminous retainer plate. For example, the foraminous retainer plate may define a plurality of honeycomb-shaped openings therein. The inlet pipe in some embodiments may terminate upstream of the foraminous retainer plate. According to some exemplary embodiments, each of the filtration elements may have a filtration capability falling in the range of about 1-micron absolute to about 100-micron nominal.

Preferably, the sorption zone may comprise a bed of (micro) (macro) porous solid sorbent (i.e., media), such as at least one of ion exchange resin, adsorption media and/or absorption media, including variants of these medias that remove specific contaminants. According to some exemplary embodiments, the bed of sorbent media may be supported on a foraminous bottom plate in the interior space of the housing. Preferably, the outlet pipe may extend between the outlet port and a location downstream of the foraminous bottom plate. In addition, a dewatering pipe may extend from a dewatering port on the housing to a location downstream of the foraminous support plate. A media fill pipe may extend from a media fill port on the housing to a location downstream of the separator plate but upstream of the foraminous support plate. According to some exemplary embodiments, the inlet port, the outlet port, the dewatering port, and the media fill port may be circumscribed by a cylindrical collar closeable with a lid.

Another aspect of the present invention provides a vessel for treatment of liquid comprising a housing having an inlet port connectable to an influent pipe and an outlet port connectable to an effluent pipe, the housing defining an interior space. An inlet pipe is in fluid communication with the inlet port and is configured to conduct liquid to be treated from the inlet port into the interior space of the housing. An outlet pipe is in fluid communication with the outlet port and is configured to conduct treated liquid from the interior space of the housing to the outlet port. The interior space of the housing defines a mechanical filtration zone and a sorption zone downstream of the mechanical filtration zone.

The mechanical filtration zone has a mechanical filtration assembly adapted to receive the liquid to be treated from the inlet pipe and produce filtered liquid. According to this aspect, the mechanical filtration assembly has a plurality of cylindrical filtration elements each having a filtration capability falling in the range of about 1-micron absolute to about 100-micron nominal. In addition, the sorption zone has a sorption assembly including a bed of sorption media adapted to remove at least one colloidal or soluble contaminant from the filtered liquid to produce the treated liquid.

Those skilled in the art will appreciate the scope of the present invention and realize additional aspects thereof after reading the following detailed description of preferred embodiments in association with the accompanying drawing figures.

BRIEF DESCRIPTION OF THE DRAWINGS

A full and enabling disclosure of the present invention, including the best mode thereof directed to one of ordinary skill in the art, is set forth in the specification, which makes reference to the appended drawings, in which.

Figure 1:
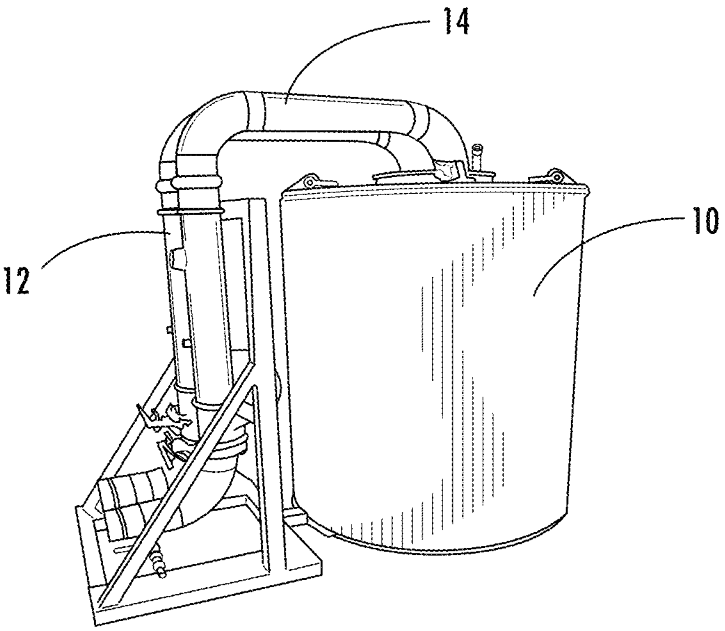
FIG. 1 illustrates a disposable treatment vessel in accordance with the present invention connected to influent and effluent pipes for liquid treatment.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations.

Various systems and techniques of liquid treatment for removal of radioactive material in the liquid are shown and described in U.S. Pat. No. 6,387,274, entitled "System and Method for the Removal of Radioactive Particulate from Liquid Waste"; U.S. Pat. No. 9,218,897, entitled "Wastewater Treatment and Radioactive Material Disposal Container"; International App. Pub. No. WO 2013/085644, entitled "Fluid Treatment System"; and U.S. Pat. Pub. No. 2018/0186662 A1, entitled "Apparatus and Method for Removal of Radionuclides in Liquids." The foregoing patent and patent applications are each incorporated herein by reference in their entireties for all purposes.

Embodiments of the present invention provide a liquid treatment system and a method for removing contaminants such as radionuclides from liquids. Some embodiments of the present invention are particularly suitable for use in processing radioactive water at nuclear facilities, and the below discussion will describe preferred embodiments in that context. For example, embodiments of the present invention provide novel systems and methods that can be used to address various water treatment issues, including treatment of water in nuclear facility reservoirs such as spent fuel pools. However, persons skilled in the art will understand that the present invention is not so limited. In fact, it is contemplated that embodiments of the present invention may be used with any liquid containing nuclear fission products and in industrial environments other than a nuclear facility.

Embodiments of the present invention combine mechanical filtration and sorption technology capable of colloid removal and demineralization in the same vessel. Embodiments of the present invention are thus able to remove both undissolved and dissolved solids and a large portion of the fine colloidal (sub-micron particulate) and soluble (dissolved) radioactive isotopes. Embodiments of this invention will further increase the ability to remove the unwanted radioisotopes providing decreased chance of radiological exposure to the workers.

For example, vessels in accordance with the present invention can address the removal of particulate, colloidal particles, and soluble activity in nuclear plant spent fuel pools (and other similar applications), lowering radiation dose rates to the lowest achievable values and thereby mitigating the whole-body dose received by plant personnel working in the general areas of these pools. Lowering the concentration of radioactive isotopes also equates to reduced decontamination times for reactor cavities and similar reservoirs and mitigates personnel contamination events. Other tangible benefits include improved water visibility (i.e., mitigates impacts to critical path work due to visibility issues), and improved handling, packaging, classification, and disposal of the final waste product.

FIG. 1 illustrates an exemplary vessel 10 for treatment of liquid constructed in accordance with the present invention. An external influent pipe 12 provides untreated water to vessel 12, whereas an external effluent pipe 14 supplies treated water from vessel 10. As used herein, "untreated"

means that the liquid has not been treated by the process of vessel 10. It may or may not have been previously treated by some other process.

Figure 2:
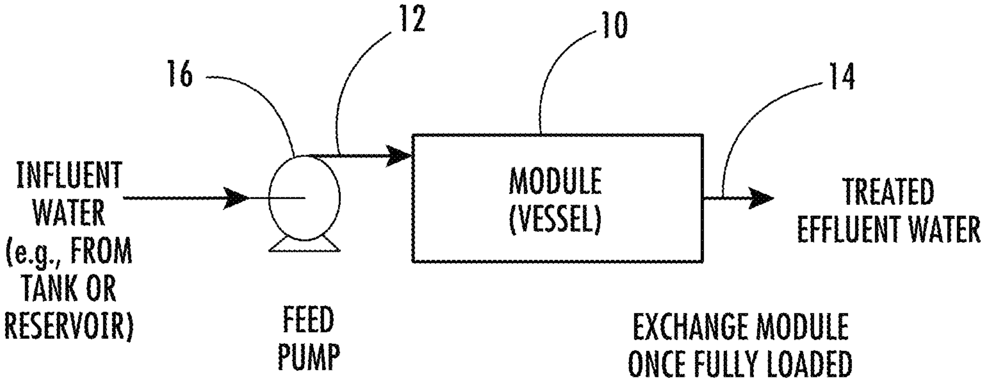
FIG. 2 is a diagrammatic representation showing a liquid treatment process in accordance with the present invention.
Figure 3:
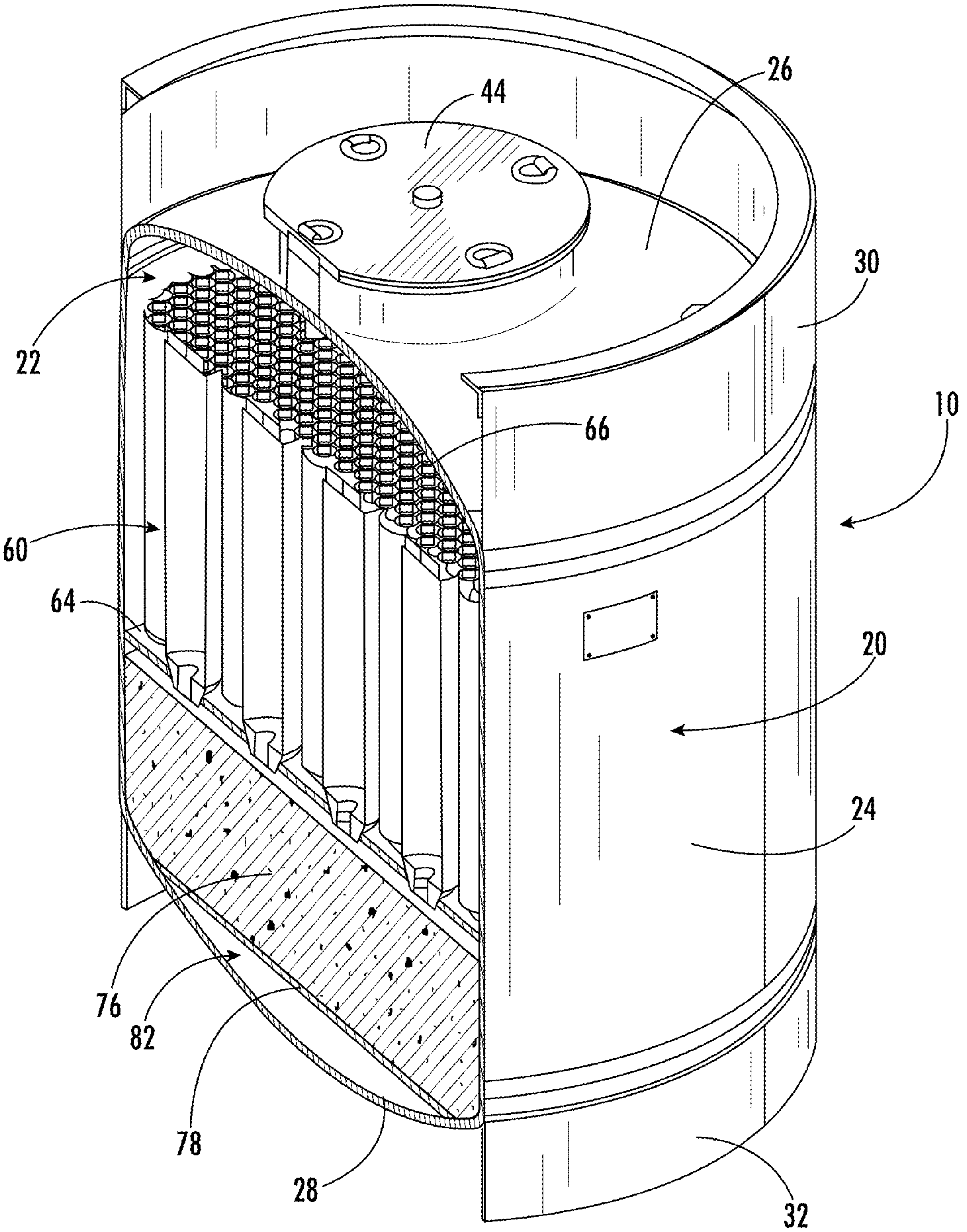
FIG. 3 is an isometric off-center cross-sectional view of a disposable treatment vessel in accordance with the present invention.

As shown in FIG. 2, a feed pump 16 typically supplies untreated water from a source such as a spent fuel pool to influent pipe 12. Within vessel 10, the water first passes through a mechanical filtration zone to remove particulate down to a certain size (e.g., low micron). A subsequent sorption zone removes a large portion of any fine colloidal (sub-micron) particulate and soluble (dissolved) material (e.g., radioactive isotopes) in the filtered liquid. The treated liquid may be discharged, sent to a holding area for storage, or returned to the source as necessary or appropriate. In the case of a spent fuel pool, for example, the effluent liquid may be returned to the pool and recirculated through the vessel 10 many times.

Referring now to FIGS. 3-7, vessel 10 comprises a housing 20 typically formed of metallic material such as stainless steel or another suitable steel. Depending on the application, housing 20 may take the form of a "liner" or "container" as those terms are understood in the art. Liners can be provided in various industry standard disposal liner sizes (i.e., 120 ($ft^3$), 160, 200-size disposal liners, etc.). Smaller containers can be provided, for example, as 35, 55, or 85-gallon size containers. Preferably, the liners and containers will, as a minimum, meet IP-1 type transportation standards. The vessel 10 may be designed, constructed and tested to ASME Section VIII pressure vessel and/or ASME B31.1/B31.3 piping standards. Vessels 10 can be configured to support various flows rates from, for example, 1 to 1000 gpm. Preferably, the entire vessel 10 may be disposed of after use.

Housing 20 defines an interior space 22 in which the filtration and sorption zones are contained. In this case, housing 20 is constructed as a pressure vessel having a cylindrical portion 24 capped by a dome-shaped top 26 and a dome-shaped bottom 28. Cylindrical skirts 30 and 32 are provided at the top and bottom to give vessel 10 a more cylindrical shape with a flat base that keeps it upright. This, for example, facilitates placement of vessel 10 on a flat surface and/or stacking of vessels 10 when not in use.

An inlet port 34, an outlet port 36, a dewatering port 38, and a media fill port 40 are located on top 26 of housing 20. One skilled in the art will appreciate that influent pipe 12 and effluent pipe 14 will be fluidly connected to inlet port 34 and outlet port 36, respectively. The functions of dewatering port 38 and media fill port 40 will be explained more fully below. Preferably, each of these ports may be individually covered by a respective cap or lid, when disconnected from external piping. In addition, all of ports 34, 36, 38, and 40 are circumscribed in this case by a collar 42 attached to the top 26 of housing 20. A lid 44 may be provided to cover the open end of collar 42, thus covering ports 34, 26, 38, and 40 when vessel 10 is disconnected from external piping. Lid 44, which may be made according to ALARA (as low as reasonably possible) principles, is preferably attached to collar 42 when vessel 10 is fully loaded, dewatered or otherwise ready for interim storage or disposal. As shown, a plurality of lifting lugs 45 may be provided on top 26 of housing 20 to facilitate movement of vessel 10.

Figure 4:
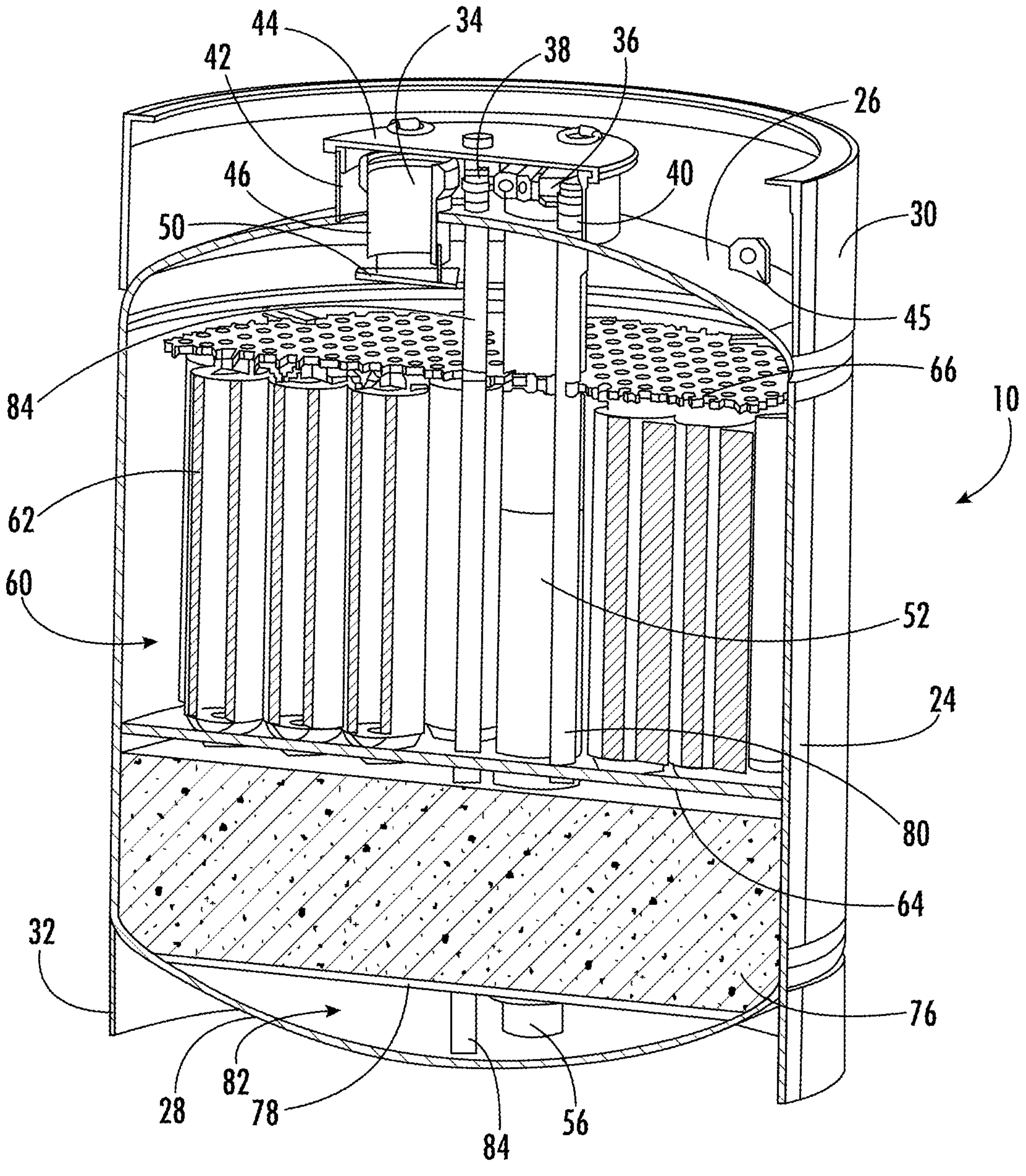
FIG. 4 is an isometric cross-sectional view of a disposable treatment vessel in accordance with the present invention.
Figure 5:
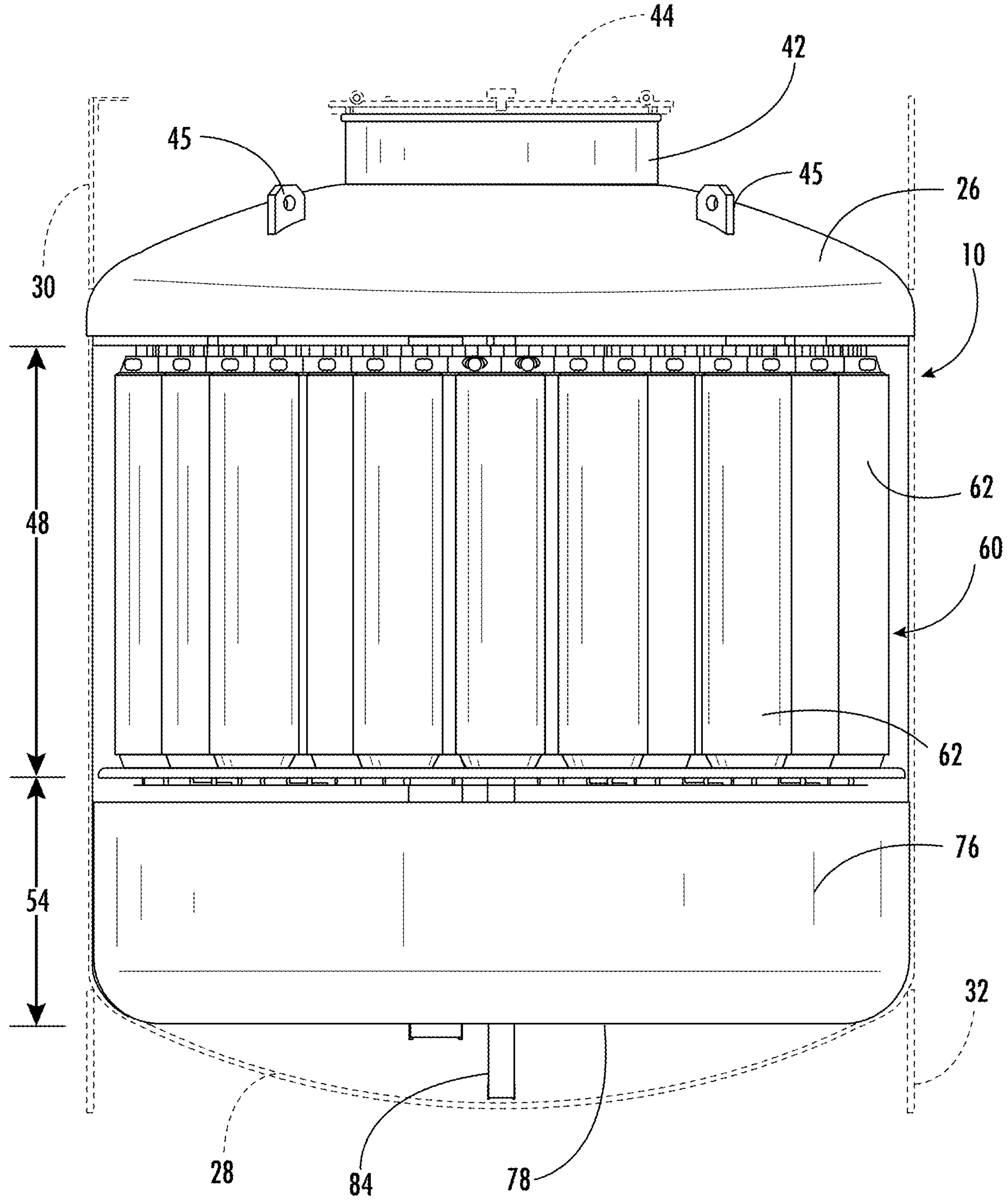
FIG. 5 is a side elevation of a disposable treatment vessel in accordance with the present invention with an outer shell of the housing shown in phantom to reveal certain internal components.
Figure 6:
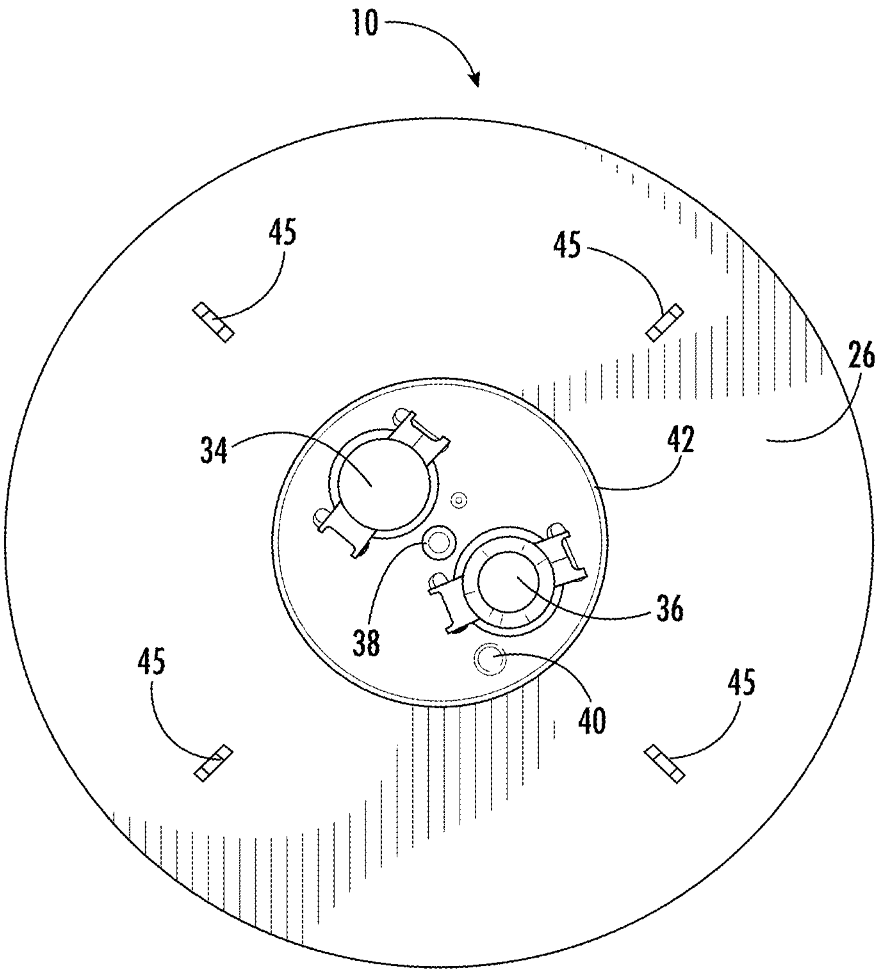
FIG. 6 is a top view of a disposable treatment vessel in accordance with the present invention.
Figure 7:
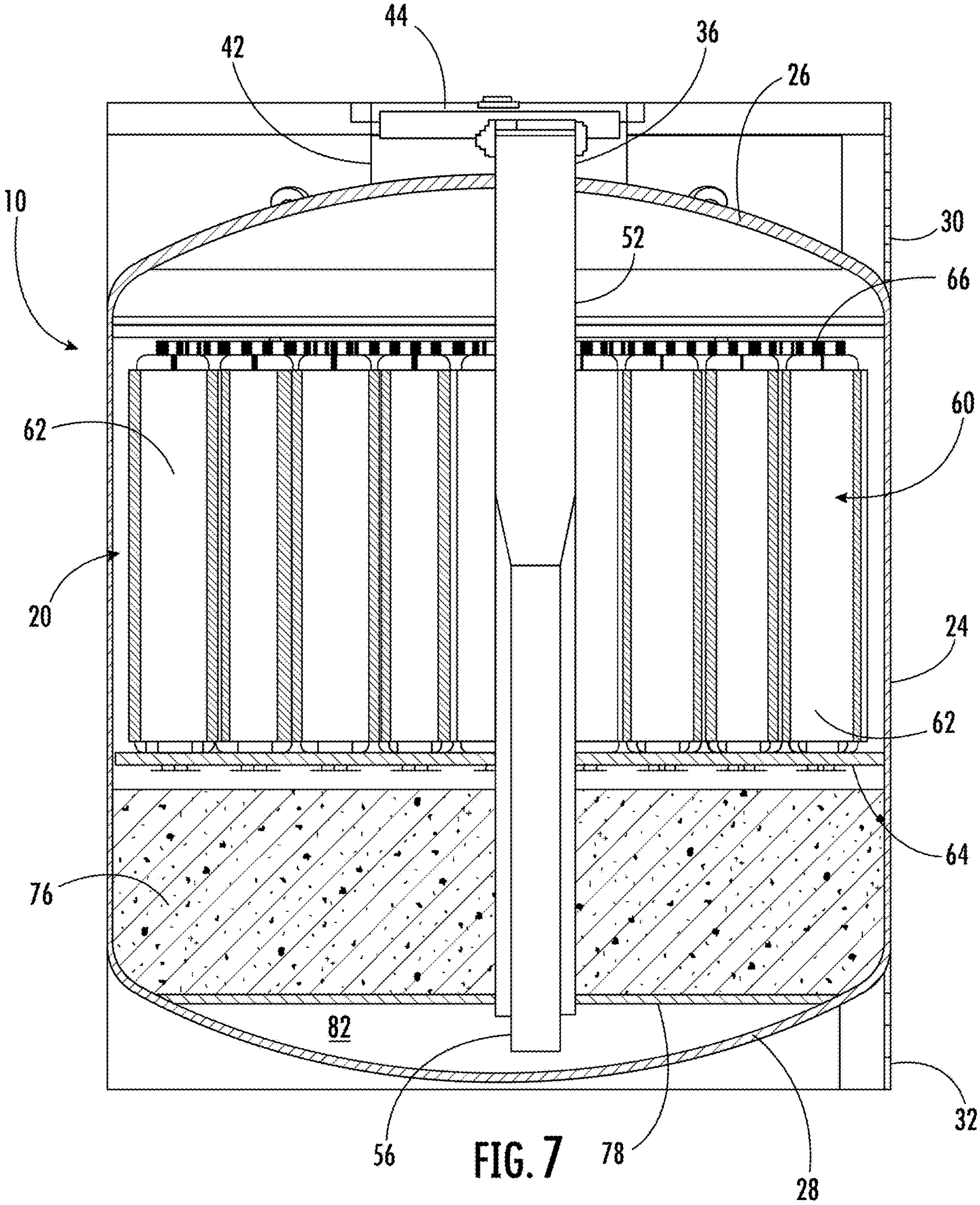
FIG. 7 is a cross-sectional view of a disposable treatment vessel in accordance with the present invention.

Referring now particularly to FIG. 4, inlet port 34 forms the proximal end of an inlet pipe 46 that extends into the interior space 22. In this case, the distal end of inlet pipe 46 terminates near the top of housing 20, thus introducing liquid to be treated into the interior space 22 upstream of the mechanical filtration zone 48 (FIG. 5). A spreader 50 in the form of a fixed plate may be located below the distal (bottom) end of inlet pipe 46 to distribute the untreated liquid as it is introduced.

Figure 8:
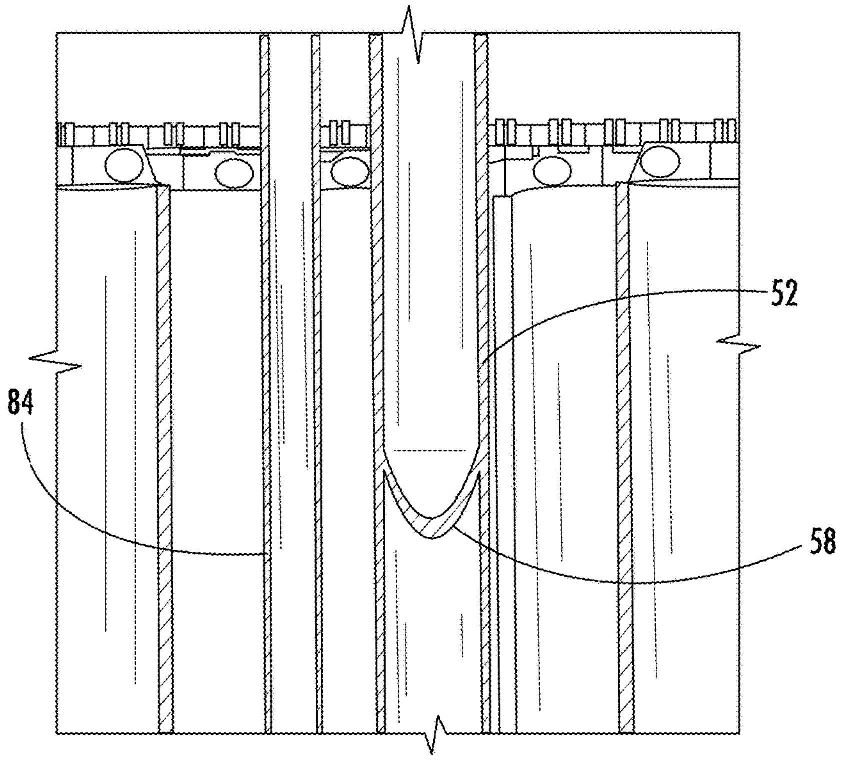
FIG. 8 is an enlarged cross-sectional view showing a portion of the outlet pipe and dewatering pipe in a disposable treatment vessel in accordance with the present invention along with certain other components.

Outlet port 36 forms the proximal end of an outlet pipe 52 that extends from the interior space 22. In this case, the distal end of outlet pipe 52 is located near the bottom of housing 20 downstream of the sorption zone 54 (FIG. 5). As a result, treated water may be conducted from the interior space 22 of the housing 20 to the outlet port 36. Preferably, an outlet screen 56 may be disposed in the distal end of outlet pipe 52 to, for example, capture any sorption media that may have escaped the sorption zone 54. In addition to or instead of outlet screen 56, one or more wedge screens 58 (FIG. 8) may also be provided in outlet pipe 52.

Referring now particularly to FIGS. 3-5 and 7, mechanical filtration zone 48 comprises a mechanical filtration assembly 60 here having a plurality of cylindrical filtration elements 62. Each of the filtration elements will typically have a suitable frame to provide rigidity to the overall structure and to support the filter media through which liquid flows. In many preferred embodiments, at least forty such filtration elements may be provided, at least fifty such filtration elements may be provided, etc. to provide the desired throughput and service life. For example, the illustrated embodiment utilizes fifty-four cylindrical filtration elements. The filtration capability of the cylindrical filtration elements 62 may be chosen based on the application but will typically range from about 1-micron (~0.3 micron nominal) to about 100-micron nominal in various applications.

As shown, the cylindrical filtration elements 62 are arranged vertically in parallel to one another between a separator plate 64 and a foraminous retainer plate 66. Preferably one or more tie rods (not shown) may extend between plates 64 and 66 to secure the cylindrical filtration elements 62 in position. As noted above, untreated liquid flowing into interior space 22 is initially distributed by a spreader 50. The liquid then flows through retainer plate 66, which further distributes the liquid as it flows into the region around the cylindrical filtration elements 62. In this case, the flow apertures of retainer plate 66 form a honeycomb pattern. The unfiltered liquid then flows through the filter media into the interior of the cylindrical filtration elements 62 from the outside in.

Figure 10:
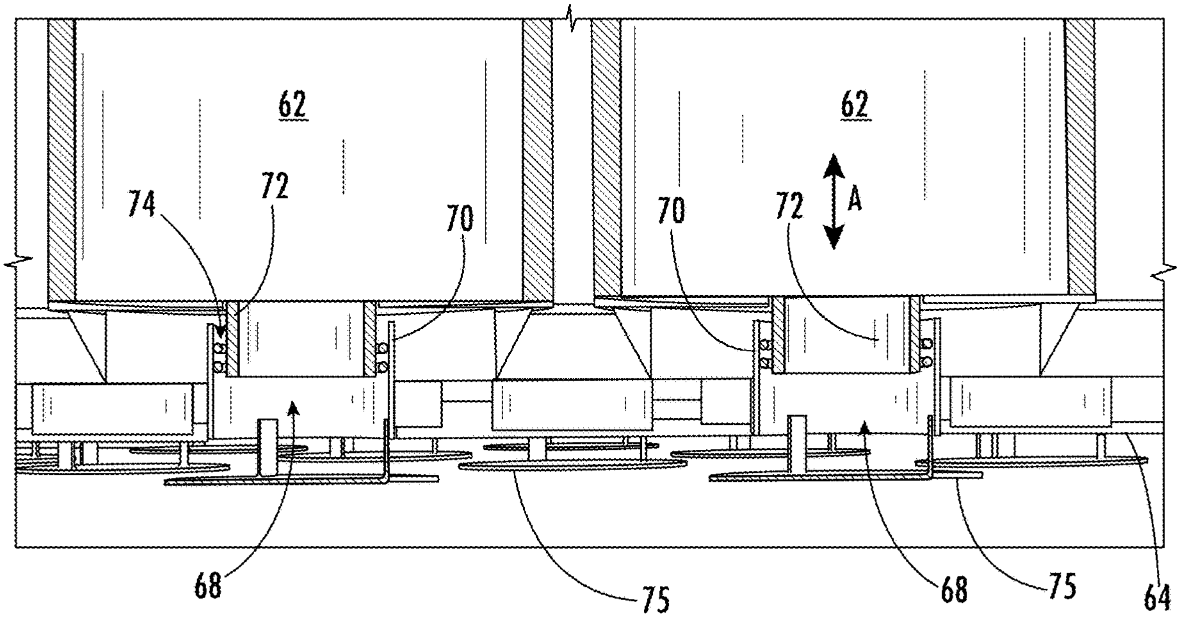
FIG. 10 is an enlarged cross-sectional view showing a portion of the filter to separator plate interface in accordance with the present invention along with certain other components.

It will be appreciated that separator plate 64, which is fixed at an intermediate vertical location to the inner wall of cylindrical portion 24 in fluid tight manner, serves to separate the mechanical filtration zone 48 from the sorption zone 54. Referring now also to FIG. 10, a plurality of through bores, such as those indicated at 68, are defined in separator plate 64 to allow passage of filtered liquid from the mechanical filtration zone 48 to the sorption zone 54. In this case, each of the through bores includes an upwardly extending sleeve 70 into which a filter outlet 72 of a respective cylindrical filtration element 62 is received. As shown, filter outlets 72 are concentric with a longitudinal axis A of the filtration element 62. Suitable gaskets, such as the O-ring seals indicated at 74, may be provided between the sleeve 70 and the filter outlet 72 to provide a fluid-tight connection. Respective spreaders in the form of small fixed plates 75 may be located below each of the through bores 68 to distribute the filtered water as it enters the sorption zone 50.

Referring again to FIGS. 3-4 and 7, sorption zone 54 is formed by a bed 76 of suitable media located on a foraminous support plate 78. As shown, support plate 78 is located in fixed position near the bottom of interior space 22. The media may be added as necessary or desired via a media fill pipe 80 (FIG. 4). The proximal end of media fill pipe 80 forms media port 40. The distal end of media fill pipe 80 terminates just below separator plate 64, as shown.

As those familiar with the art will understand, there are many types of beaded and granular medias used for the selective removal of contaminants such as radionuclides from aqueous liquids. These include various sorption media, such as but not limited to media that perform ion exchange, adsorption, absorption, coprecipitation, etc. Therefore, the term "sorption" contemplates multiple removal mechanisms. Preferably, the media 76 is selected so that a large portion of fine colloidal (sub-micron) particulate and soluble (dissolved) radioactive isotopes are removed from the filtered liquid.

Figure 9:
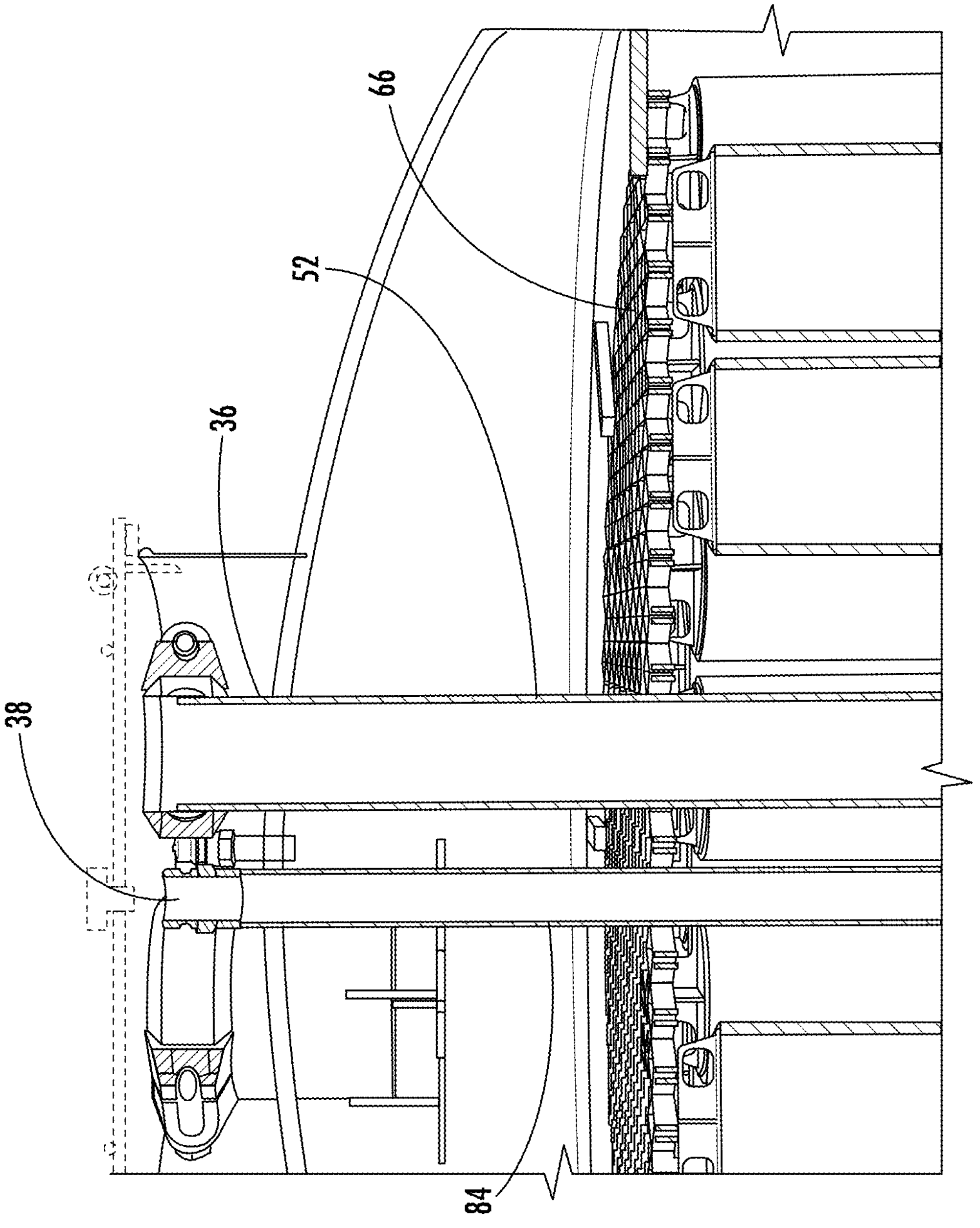
FIG. 9 is an enlarged cross-sectional view showing a portion of the outlet pipe and dewatering pipe in a disposable treatment vessel in accordance with the present invention along with certain other components.

The region below support plate 78 provides a space 82 at which the treated water gathers before being passed into the distal end of outlet pipe 52. In addition, as shown in FIG. 4, the distal end of a dewatering pipe 84 is also located in the space 82. As can be seen, the distal end of dewatering pipe 84 is preferably closer to the bottom of interior space 22 than the distal end of outlet pipe 52. This allows nearly complete removal of liquid contained in vessel 10. Referring now also to FIG. 9, the proximal end of dewatering pipe 84 defines dewatering port 38.

Preferably the size, number, and cumulative capacity of the filter elements 62 will be selected to approximate the useful life of the media bed 72. Ideally the filtration elements for the mechanical filtration zone (48) and the sorbent for the sorption zone (54) would be selected that each of these zones become fully loaded at the same time.

$$C(F)=C(S)$$

Where,

C(F)=Filtration Capacity

C(S)=Sorption Capacity

The end user will typically determine whether it is most beneficial to limit the life of this invention based on C(F) or C(S). In any event, when vessel 10 is at the end of its service life, all external piping is disconnected and any liquid contained in it is removed via dewatering port 38. Lid 44 is then attached to collar 42. The entire vessel 10 may then be placed in a cask as necessary or desired, and disposed.

It can thus be seen that embodiments of the present invention provide a process and method for treatment of liquid such as radioactive liquid. Various embodiments provide a unique way of addressing the removal of particulate, colloidal particles, and soluble activity in a compact, disposable container that does not require multiple handling and classification events. As a result, preferred embodiments achieve one or more of the following distinct advantages:

- Lowers dose rates to the lowest achievable values and thereby mitigates the whole-body dose received by plant personnel working in the general area of spent fuel pools.
- Lowers the concentration of radioactive isotopes which equates to reduced cavity decontamination times and mitigates personnel contamination events.
- Provides improved visibility (i.e., mitigates impacts to critical path due to visibility issues).
- Provides improved handling, packaging, classification, and disposal of the final waste product.
- Combines filtration and sorption technologies in a common treatment vessel that is simple to mobilize, operate and disposition; this simplicity reduces onsite manpower and task duration, thus saving money and time.

While one or more preferred embodiments of the invention have been described above, it should be understood that any and all equivalent realizations of the present invention are included within the scope and spirit thereof. The embodiments depicted are presented by way of example only and are not intended as limitations upon the present invention. Thus, it should be understood by those of ordinary skill in this art that the present invention is not limited to these embodiments since modifications can be made. Therefore, it is contemplated that any and all such embodiments are included in the present invention as may fall within the scope and spirit thereof.

What is claimed is:

1. A vessel for treatment of liquid comprising:

a housing having an inlet port connectable to an influent pipe and an outlet port connectable to an effluent pipe, said housing defining an interior space;

an inlet pipe in fluid communication with said inlet port, said inlet pipe being configured to conduct liquid to be treated from the inlet port into the interior space of the housing;

an outlet pipe in fluid communication with the outlet port, said outlet pipe being configured to conduct treated liquid from the interior space of the housing to the outlet port;

the interior space of the housing defining a mechanical filtration zone and a sorption zone downstream of the mechanical filtration zone;

the mechanical filtration zone having a mechanical filtration assembly adapted to receive the liquid to be treated from the inlet pipe and produce filtered liquid;

the sorption zone having a sorption assembly adapted to remove at least one colloidal or soluble contaminant from the filtered liquid to produce the treated liquid; a separator plate at an intermediate location in the interior space of the housing to separate the mechanical filtration zone from the sorption zone, the separator plate defining at least one through bore for passage of the filtered liquid from the mechanical filtration zone to the sorption zone; wherein the mechanical filtration assembly comprises a plurality of cylindrical filtration elements located in the mechanical filtration zone.

2. A vessel as set forth in claim 1, wherein the separator plate defines a plurality of through bores, each in fluid communication with a filter outlet of a respective one of the plurality of cylindrical filtration elements.

3. A vessel as set forth in claim 2, wherein the filter outlet of each of the cylindrical filtration elements is concentric with an axis of the cylindrical filtration element.

4. A vessel as set forth in claim 2, further comprising a plurality of spreader elements connected to the separator plate respectively adjacent to at least some of the through bores to spread the filtered liquid as it enters the sorption zone.

5. A vessel as set forth in claim 2, wherein said plurality of filtration elements are mounted in parallel with one another.

6. A vessel as set forth in claim 5, wherein said plurality of filter elements are captured between the separator plate and a foraminous retainer plate.

7. A vessel as set forth in claim 6, wherein the foraminous retainer plate defines a plurality of honeycomb-shaped openings therein.

8. A vessel as set forth in claim 6, wherein the inlet pipe terminates upstream of the foraminous retainer plate.

9. A vessel as set forth in claim 1, wherein the plurality of filtration elements comprises at least five filtration elements.

10. A vessel as set forth in claim 9, wherein each of the filtration elements has a filtration capability falling in the range of about 1-micron absolute to about 100-micron nominal.

11. A vessel as set forth in claim 1, wherein the sorption zone comprises a bed of sorption media.

12. A vessel as set forth in claim 11, wherein the bed of (micro) (macro) porous solid sorbent (i.e., media) comprises at least one of ion exchange resin, adsorption media, and/or absorption media, including variants of these medias that remove specific contaminants.

13. A vessel as set forth in claim 11, wherein the bed of sorption media is supported on a foraminous support plate in the interior space of the housing.

14. A vessel as set forth in claim 12, wherein the outlet pipe extends between the outlet port and a location downstream of the foraminous support plate.

15. A vessel as set forth in claim 14, further comprising a dewatering pipe that extends from a dewatering port on the housing to a location downstream of the foraminous support plate.

16. A vessel as set forth in claim 15, further comprising a media fill pipe that extends from a media fill port on the housing to a location downstream of the separator plate but upstream of the foraminous support plate.

17. A vessel as set forth in claim 16, wherein the inlet port, the outlet port, the dewatering port, and the media fill port are circumscribed by a cylindrical collar closable with a lid.

18. A vessel as set forth in claim 1, wherein the vessel is adapted to be closed after use and disposable.

19. A vessel for treatment of liquid comprising:

a housing having an inlet port connectable to an influent pipe and an outlet port connectable to an effluent pipe, said housing defining an interior space;

an inlet pipe in fluid communication with said inlet port, said inlet pipe being configured to conduct liquid to be treated from the inlet port into the interior space of the housing;

an outlet pipe in fluid communication with the outlet port, said outlet pipe being configured to conduct treated liquid from the interior space of the housing to the outlet port;

the interior space of the housing defining a mechanical filtration zone and a sorption zone downstream of the mechanical filtration zone;

the mechanical filtration zone having a mechanical filtration assembly adapted to receive the liquid to be treated from the inlet pipe and produce filtered liquid, the mechanical filtration assembly having a plurality of cylindrical filtration elements each having a filtration capability falling in the range of about 1-micron absolute to about 100-micron nominal; and the sorption zone having a sorption assembly including a bed of sorption media adapted to remove at least one colloidal or soluble contaminant from the filtered liquid to produce the treated liquid.

20. A vessel as set forth in claim 19, comprising a separator plate at an intermediate location in the interior space of the housing to separate the mechanical filtration zone from the sorption zone, the separator plate defining at least one through bore for passage of the filtered liquid from the mechanical filtration zone to the sorption zone.

21. A vessel as set forth in claim 20, wherein the separator plate defines a plurality of through bores, each in fluid communication with a filter outlet of a respective one of the plurality of cylindrical filtration elements.

22. A vessel as set forth in claim 21, wherein said plurality of filtration elements are mounted in parallel with one another.

23. A vessel as set forth in claim 19, wherein the bed of sorption media comprises at least one of ion exchange resin and adsorbent capable of removing specific contaminants.

24. A vessel as set forth in claim 19, further comprising a dewatering pipe that extends from a dewatering port on the housing to a location downstream of the sorption assembly.

25. A vessel as set forth in claim 24, further comprising a media fill pipe that extends from a media fill port on the housing.

26. A vessel as set forth in claim 25, wherein the inlet port, the outlet port, the dewatering port, and the media fill port are circumscribed by a cylindrical collar closable with a lid.

27. A vessel as set forth in claim 19, wherein the vessel is adapted to be closed after use and disposable.

* * * * *